United States Patent
Rincon et al.

(10) Patent No.: US 11,846,178 B2
(45) Date of Patent: Dec. 19, 2023

(54) FLOW MEASUREMENT

(71) Applicant: Baker Hughes Energy Technology UK Limited, Bristol (GB)

(72) Inventors: Mario Alonso Rincon, Bristol (GB); Anthony Vangasse, Bristol (GB); Dean Arnison, Bristol (GB)

(73) Assignee: Baker Hughes Energy Technology UK Limited, Bristol (GB)

( * ) Notice: Subject to any disclaimer, the term of this patent is extended or adjusted under 35 U.S.C. 154(b) by 440 days.

(21) Appl. No.: 17/050,505

(22) PCT Filed: Apr. 26, 2019

(86) PCT No.: PCT/EP2019/025131
§ 371 (c)(1),
(2) Date: Oct. 26, 2020

(87) PCT Pub. No.: WO2019/206463
PCT Pub. Date: Oct. 31, 2019

(65) Prior Publication Data
US 2021/0096010 A1 Apr. 1, 2021

(30) Foreign Application Priority Data

Apr. 27, 2018 (GB) ..................... 1806965
Apr. 23, 2019 (GB) ..................... 1905655

(51) Int. Cl.
*E21B 47/10* (2012.01)
*G01F 1/74* (2006.01)
(Continued)

(52) U.S. Cl.
CPC ............. *E21B 47/10* (2013.01); *E21B 47/06* (2013.01); *G01F 1/74* (2013.01); *G01F 5/005* (2013.01); *G01F 1/44* (2013.01)

(58) Field of Classification Search
CPC ..... G01F 1/74; G01F 1/44; G01F 1/36; G01F 1/588; G01F 5/005; G01F 1/363;
(Continued)

(56) References Cited

U.S. PATENT DOCUMENTS

| 6,561,041 B1 * | 5/2003 | Eck | E21B 47/10 73/861.04 |
| 2004/0084180 A1 * | 5/2004 | Shah | E21B 47/10 166/250.16 |

(Continued)

FOREIGN PATENT DOCUMENTS

| WO | 2017039458 A1 | 3/2017 |
| WO | WO20180033524 | 2/2018 |

OTHER PUBLICATIONS

Examination Report received for Australian Application No. 2019259296, dated Feb. 17, 2022, 3 pgs.

*Primary Examiner* — Yoshihisa Ishizuka
*Assistant Examiner* — Carter W Ferrell
(74) *Attorney, Agent, or Firm* — MINTZ LEVIN COHN FERRIS GLOVSKY AND POPEO, PC

(57) ABSTRACT

A method of determining an estimated flow rate for at least one phase of a multi-phase fluid flowing from a subsea well; a subsea well; and a system for determining an estimated flow rate for at least one phase of a multi-phase fluid flowing from a subsea well are disclosed. The method of determining an estimated flow rate for at least one phase of a multi-phase fluid flowing from a subsea well comprises determining a mass or volumetric flow rate of a fluid in a completion or production tree of a subsea well; determining a Water Liquid Ratio (WLR) of said a fluid via a water sampling device; determining an upstream fluid pressure and an upstream fluid temperature of said a fluid at a location upstream of a production choke valve in the subsea production tree via at least one pressure sensor element and at least one tempera- (Continued)

ture sensor element of the subsea production tree; determining a downstream fluid pressure and a downstream fluid temperature of a fluid at a location downstream of the production choke valve via at least one pressure sensor element and at least one temperature sensor element of the subsea production tree; determining a downhole fluid pressure and a downhole fluid temperature of said a fluid via at least one pressure sensor element and at least one temperature sensor element located downhole in the completion; and providing each of the determined mass or volumetric flow rate, water liquid ratio, upstream fluid pressure, upstream fluid temperature, downstream fluid pressure, downstream fluid temperature, downhole fluid pressure and downhole fluid temperature as respective inputs for a statistical estimator unit and, via the statistical estimator unit, determining an estimated flow rate for each of at least one phase of fluid flowing downstream of the choke valve.

17 Claims, 10 Drawing Sheets

(51) Int. Cl.
  *G01F 5/00* (2006.01)
  *E21B 47/06* (2012.01)
  *G01F 1/44* (2006.01)

(58) Field of Classification Search
  CPC ... G01F 25/10; G01F 1/00; G01F 5/00; E21B 47/10; E21B 47/07; E21B 43/00; E21B 47/06; E21B 47/113; E21B 47/114; E21B 21/08; E21B 2200/20; E21B 47/008; G01M 3/26
  See application file for complete search history.

(56) References Cited

U.S. PATENT DOCUMENTS

| | | |
|---|---|---|
| 2004/0216884 A1 | 11/2004 | Bodine et al. |
| 2009/0198477 A1 | 8/2009 | Benish |
| 2010/0023269 A1* | 1/2010 | Yusti ............... E21B 49/008 702/12 |
| 2016/0133835 A1 | 5/2016 | Dillard et al. |
| 2016/0320769 A1* | 11/2016 | Deffenbaugh ......... E21B 47/06 |
| 2017/0058664 A1* | 3/2017 | Xiao .................. E21B 47/06 |
| 2019/0169982 A1* | 6/2019 | Hauge ................ E21B 43/10 |
| 2020/0133251 A1* | 4/2020 | Rossi ................. E21B 43/12 |
| 2021/0181374 A1* | 6/2021 | Sandnes ............... G06F 30/27 |

* cited by examiner

FLOW MEASUREMENT

The present invention relates to the measurement of flow of fluids to or from subsea wells of subsea oil and gas fields. In particular, but not exclusively, the present invention relates to the estimation of flow rates for multiple phases (for example oil, gas, water) in fluid flowing from a subsea well.

Conventionally subsea oil and gas fields include multiple subsea wells which include a completion and production tree making an interface between a geologic reservoir and a subsea flow line. As a result there has been a requirement for measurement of flow of fluid to or from the wells in order to facilitate effective control and to attempt to optimise production in accordance with an operators objectives. As capital outlay is a detractor from the operator's cash flow and overall financial returns the cost of physical subsea and downhole instrumentation associated with the measurement of such flow has been an inhibitor of further subsea field development.

Virtual flow metering has been used for the purposes of augmenting an accuracy of an existing asset or to provide a back-up system should in-place subsea instruments fail or drift out of original specification. Such virtual flow meters have used large numbers of subsea sensor elements and instrumentation which has led to an associated cost and weight. Multi-Phase Flow Meter (MPFM) technology and Wet Gas Flow Meter (WFGM) technology has also been suggested. MPFM and WGFM systems utilise multiple sensing instruments aggregated at a single location and, whilst being an effective measurement tool, are an exceptionally costly asset to purchase and use. Such costs can be prohibitive and prevent progress in terms of development of further hydrocarbon fields.

It is an aim of the present invention to at least partly mitigate the above-mentioned problems.

It is an aim of certain embodiments of the present invention to provide a method and apparatus for estimating gas, water, and/or oil flow from one or more subsea wells in real-time by integration of discrete measurements associated with a well from sensing elements distributed around a completion and production tree.

It is an aim of certain embodiments of the present invention for estimating multi-phase flow rates of fluid flowing from a subsea well in real-time.

It is an aim of certain embodiments of the present invention to provide data for measuring the flow to or from subsea wells in an accurate fashion but without the complex and expensive subsea instrumentation and respective supportive structures conventionally used.

According to a first aspect of the present invention there is provided a method of determining an estimated flow rate for at least one phase of a multi-phase fluid flowing from a subsea well, comprising the steps of:

determining a mass or volumetric flow rate of a fluid in a completion or production tree of a subsea well;

determining a Water Liquid Ratio (WLR) of said a fluid via a water sampling device;

determining an upstream fluid pressure and an upstream fluid temperature of said a fluid at a location upstream of a production choke valve in the subsea production tree via at least one pressure sensor element and at least one temperature sensor element of the subsea production tree;

determining a downstream fluid pressure and a downstream fluid temperature of a fluid at a location downstream of the production choke valve via at least one pressure sensor element and at least one temperature sensor element of the subsea production tree;

determining a downhole fluid pressure and a downhole fluid temperature of said a fluid via at least one pressure sensor element and at least one temperature sensor element located downhole in the completion; and providing each of the determined mass or volumetric flow rate, water liquid ratio, upstream fluid pressure, upstream fluid temperature, downstream fluid pressure, downstream fluid temperature, downhole fluid pressure and downhole fluid temperature as respective inputs for a statistical estimator unit and, via the statistical estimator unit, determining an estimated flow rate for each of at least one phase of fluid flowing downstream of the choke valve.

Aptly the method further comprises the steps of determining a mass or volumetric flow rate comprises determining a downhole mass or volumetric flow rate of fluid in a completion.

Aptly the method further comprises determining an optically derived distributed temperature profile of said a fluid at a downhole location via a downhole optical monitoring system; and providing the optically derived temperature profile for at least one downhole location as an input to the statistical estimator unit.

Aptly the method further comprises determining the downhole mass or volumetric flow rate via a downhole flow meter device comprising a V-cone device or Venturi device.

Aptly the method further comprises determining the downhole mass or volumetric flow rate at a location below an associated well dew point for the subsea well.

Aptly the method further comprises determining the downhole mass or volumetric flow rate at a location below an associated well bubble point for the subsea well.

Aptly the subsea well has a gas-lift configuration determining a Gas-Lift Upstream Pressure (GLUP) and a Gas-Lift Upstream Temperature (GLUT) of a gas-lift fluid upstream of a gas-lift choke valve and determining a Gas-Lift Downstream Pressure (GLDP) and a Gas-Lift Downstream Temperature (GLDT) of the gas-lift fluid downstream of the gas-lift choke valve and providing the gas-lift upstream pressure and gas-lift upstream temperature and gas-lift downstream pressure and gas-lift downstream temperature as respective inputs to the statistical estimator unit; and/or determining a Gas-Lift Fluid Flow Rate (GLFFR) via a Venturi device upstream of the gas-lift choke valve and providing the gas-lift fluid low rate as an input to the statistical estimator unit.

Aptly the method further comprises determining a plurality of discrete pressure and/or temperature values for fluid at a respective plurality of vertical depths across the subsea well and providing the discrete pressure and/or temperature values as respective inputs to the statistical estimator unit.

Aptly the method further comprises determining the downhole mass or volumetric flow rate via a pipe diameter change element and an upstream and downstream pressure sensor respectively upstream or downstream of the diameter change element.

Aptly the method further comprises determining each estimated flow rate in real time.

Aptly the method further comprises determining the estimated flow rates via a statistical estimator unit that comprises;

a statistical estimator module that receives a plurality of real inputs and that provides an interim estimated flow rate for each phase of at least one phase in a fluid for a fluid flowing from at least one subsea well; and a physics-based module comprising a flow model, a heat transfer model and a PVT model that provides estimated inputs corresponding to said real inputs that provide feedback to the statistical estimator module, said method further comprising:

iteratively calculating the estimated inputs until a last iteration when a predetermined event occurs and then providing interim estimated flow rates for each phase calculated for the last iteration as the respective determined estimated flow rate.

According to a second aspect of the present invention there is provided a subsea well, comprising:

at least one production tree comprising a production choke valve, at least one water sampling device, an upstream pressure sensor and downstream pressure sensor respectively upstream and downstream of the production choke valve and an upstream temperature sensor and downstream temperature sensor respectively upstream and downstream of the production choke valve; and a well completion, comprising production casing in a borehole and at least one completion pipeline, comprising a downhole flow meter device that determines a downhole mass or volume flow rate of fluid flowing in the completion pipeline and/or a pipe diameter change element and an upstream and downstream pressure and temperature sensor respectively upstream or downstream of the diameter change element for providing a downhole mass or volume flow rate of fluid flowing in the completion pipeline.

Aptly the subsea well further comprises the downhole flow meter device comprises a convergent or divergent diameter change member and a first and further pressure sensor element and first and further temperature sensor elements on opposed sides of the diameter change member.

Aptly the subsea well downhole flow meter device comprises a V-cone device or Venturi device.

Aptly the subsea well downhole mass flow rate device is below the well dew point in the completion pipeline.

Aptly the subsea well downhole mass flow rate device is below the well bubble point in the completion pipeline.

Aptly the subsea well further comprises the upstream pressure and temperature sensors upstream of the pipe diameter change element comprise down hole pressure and temperature (DHPT) sensors.

According to a third aspect of the present invention there is provided a system for determining an estimated flow rate for at least one phase of a multi-phase fluid flowing from a subsea well, comprising:

at least one subsea well and associated completion, comprising at least one production tree comprising a production choke valve, at least one water sampling device, an upstream pressure sensor and downstream pressure sensor respectively upstream and downstream of the production choke valve, an upstream temperature sensor and downstream temperature sensor respectively upstream and downstream of the production choke valve, production casing in a borehole, at least one completion pipeline, a flow meter device for determining a mass or volumetric flow rate of a flowing fluid and a water sampling device for determining a water liquid ratio of the flowing fluid; and a statistical estimator unit that comprises a statistical estimator module that receives a plurality of real inputs and that provides an interim estimated flow rate for each phase of at least one phase in a fluid flowing from at least one subsea well and a physics-based module comprising a flow model, a heat transfer model and a PVT model, said physics-based module providing estimated inputs corresponding to the real inputs and that provides feedback to the statistical estimator module whereby the statistical estimator unit iteratively calculates estimated inputs until a last iteration, when a predetermined event occurs, and then provides interim estimated flow rates for each phase calculated for the last iteration as the respective determined estimated flow rate.

Certain embodiments of the present invention provide a method of determining an estimated flow rate for multiple phases in a fluid flowing from a subsea well utilising a selected choice of instruments which provide a highly accurate estimate of flow rate without incurring the significant capital outlay costs which would otherwise be necessary with conventional techniques.

Certain embodiments of the present invention help minimise the subsea instrumentation and associated cost and weight for determining flow rate and in particular avoid the need for MPFMs or WGFMs. The negation of the need for MPFMs or WGFMs at a subsea well location results in less complex subsea structures being required, reduced weight on subsea structures and simplified intervention and commissioning.

Certain embodiments of the present invention can also provide improved measurement accuracy compared to conventional techniques using MPFMs and/or WGFMs. This is by use of enhanced sensor location and integration of disbursed sensors enabling capture of a wider operational envelope.

Certain embodiments of the present invention provide for improved reliability and tolerance to sensor failure than conventional techniques provide by the use of redundant measurements at different locations.

Certain embodiments of the present invention provide a reduced number of sensor elements in an overall system relative to conventional techniques thus improving cost and lead time factors.

Certain embodiments of the present invention will now be described hereinafter, by way of example only, with reference to the accompanying drawings in which.

Figure 1:
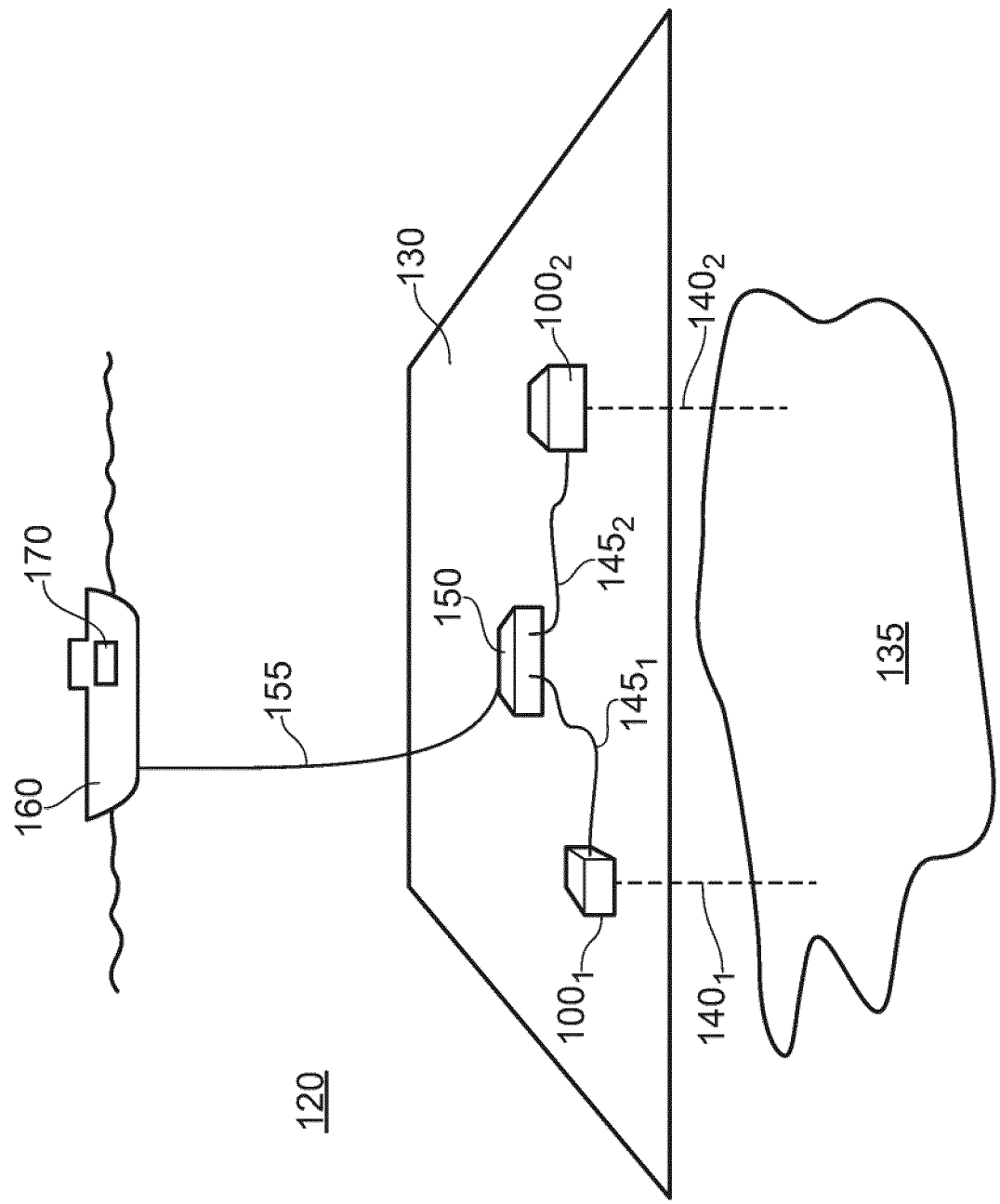
FIG. 1 illustrates a subsea well at a subsea field.

FIGS. 5 to 9 help illustrate operation of components of the statistical estimation unit.

In the drawings like reference numerals refer to like parts.

FIG. 1 illustrates a first subsea well $100_1$ and a further subsea well $100_2$ in a subsea location 120 located proximate to a hydrocarbon field 130. The hydrocarbon field 130 lies above a geologic reservoir 135.

Each subsea well 100 includes a respective production tree above a completion which helps provide a respective fluid communication path $140_1$, $140_2$ to the geologic reservoir. Each subsea well 100 is connected at a respective output to a flow line $145_1$, $145_2$ each of which is connected to a subsea manifold 150. A riser 155 extends from the sea floor manifold to a Floating Production Storage and Offloading (FPSO) vessel 160. The FPSO includes a master control centre (MCC) 170 which can be utilised to control and monitor characteristics of the flow process in the subsea wells and manifold via suitable communication links (not shown). Such links may include wireless or wired links provided by umbilicals or other methodologies.

Figure 2:
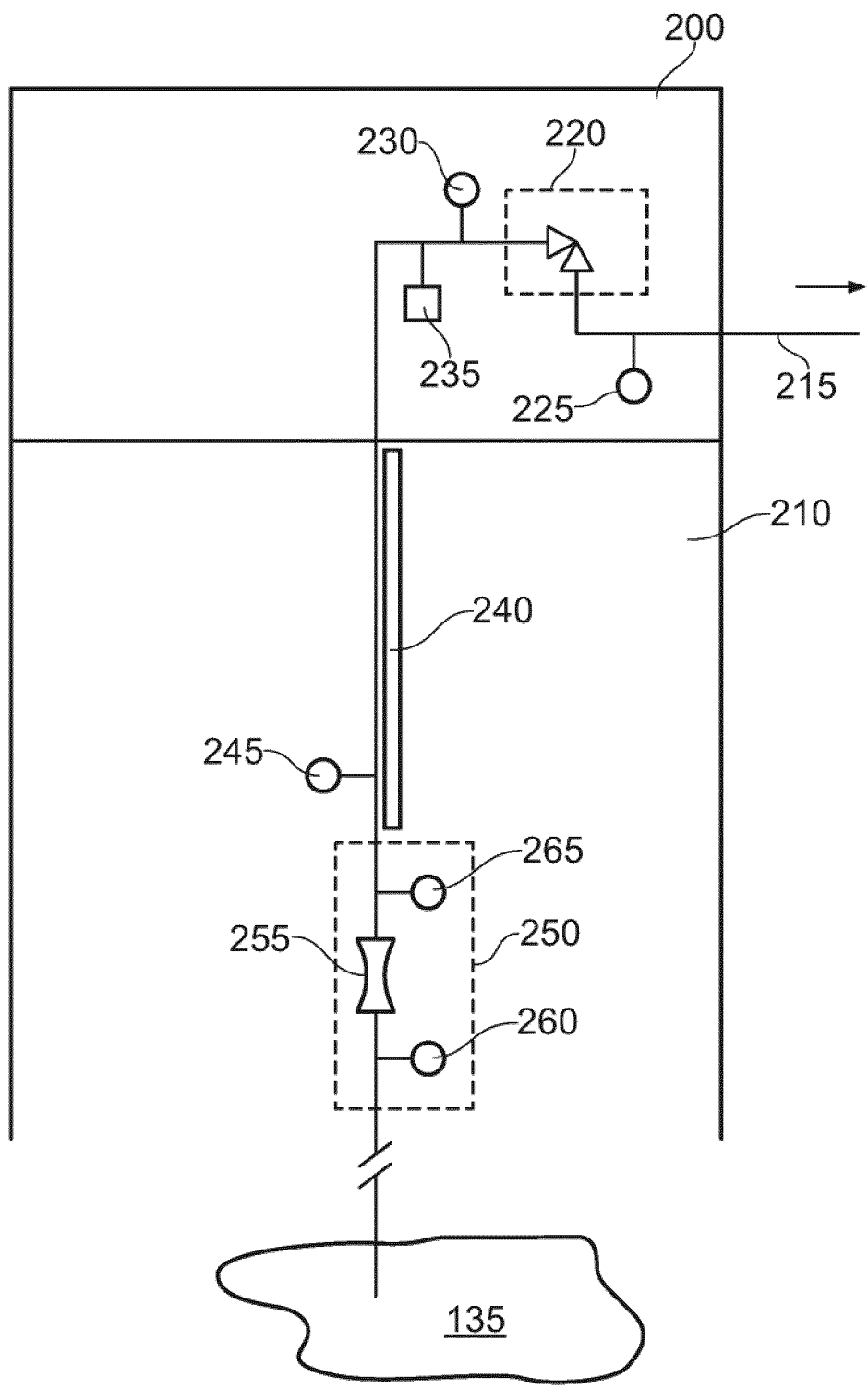
FIG. 2 illustrates a completion and production tree.

FIG. 2 illustrates a production tree 200 above an associated completion 210 at a subsea well in more detail. It will be understood that the production tree 200 and completion 210 shown include only a subset of possible features at such elements for the purposes of clarity. An outlet flow 215 is shown in FIG. 2 representing the flow of production fluid out of the production tree 200. A production choke valve 220 illustrated by the dotted rectangle in FIG. 2 helps control flow of the production fluid. Downstream of the production choke valve 220 is located a pressure sensor and temperature sensor illustrated by sensing device 225. The downstream pressure sensor and temperature sensor can be utilised to determine respective pressures and temperatures of fluid flowing out of the production choke valve 220.

An upstream (of the production choke valve) pressure and temperature sensor in a sensing device 230 are located upstream of the production choke valve 220. These provide respective pressure and temperature values for fluid flowing into the production choke valve. A water sampling device 235 is located upstream of the production choke valve 220. Aptly the water sampling device is a water cut sampling device. The water sampling device determines a Water to Liquid ratio (WLR). It will be appreciated that according to certain other embodiments of the present invention the water sampling device 235 could be located downstream of the production choke valve.

The completion 210 shown in FIG. 2 includes an optional temperature profiling sensor array 240 which extends along a vertical pipeline to determine multiple temperature points and thus provide a temperature profile. Aptly, the temperature profiling sensor array can be an optical monitoring system. A downhole pressure and temperature sensor in a sensing device 245 is used to measure a respective pressure and temperature value for fluid flowing through the pipeline from the geologic reservoir up to the production tree. Optionally additional pressure and temperature sensors could likewise be provided.

A downhole Venturi 250 is provided to determine a mass or volumetric flow rate of fluid in the completion. The Venturi device 250 includes a flow restrictor element 255 and an upstream pressure sensor and upstream temperature sensor shown as a single sensor device 260 and a downstream pressure sensor and downstream temperature sensor shown as a respective single device 265. The restrictor element 255 introduces a predetermined restriction to flow to provide a known pressure drop (between a Venturi inlet and a Venturi throat) for a given flow rate. Use of spaced apart pressure and temperature sensors can be utilised to thereby determine a mass or volumetric flow rate of fluid flowing through the restrictor element. It will be appreciated that as an alternative a single diameter changing element, which could be convergent or divergent element, which introduces a known change could be utilised with respective pressure and temperature sensors on either side. Aptly when separate elements are used rather than a single Venturi like device, the upstream pressure and temperature sensors could be provided by DHPT sensors. It will likewise be understood that as an alternative to a Venturi device other devices known to provide a mass or volumetric flow rate of fluid could be utilised such as a V-cone or the like. It will be still further understood that as an alternative to putting the mass or volumetric flow rate determining device in the completion an alternative would be to put such an arrangement in the production tree.

Figure 3A:
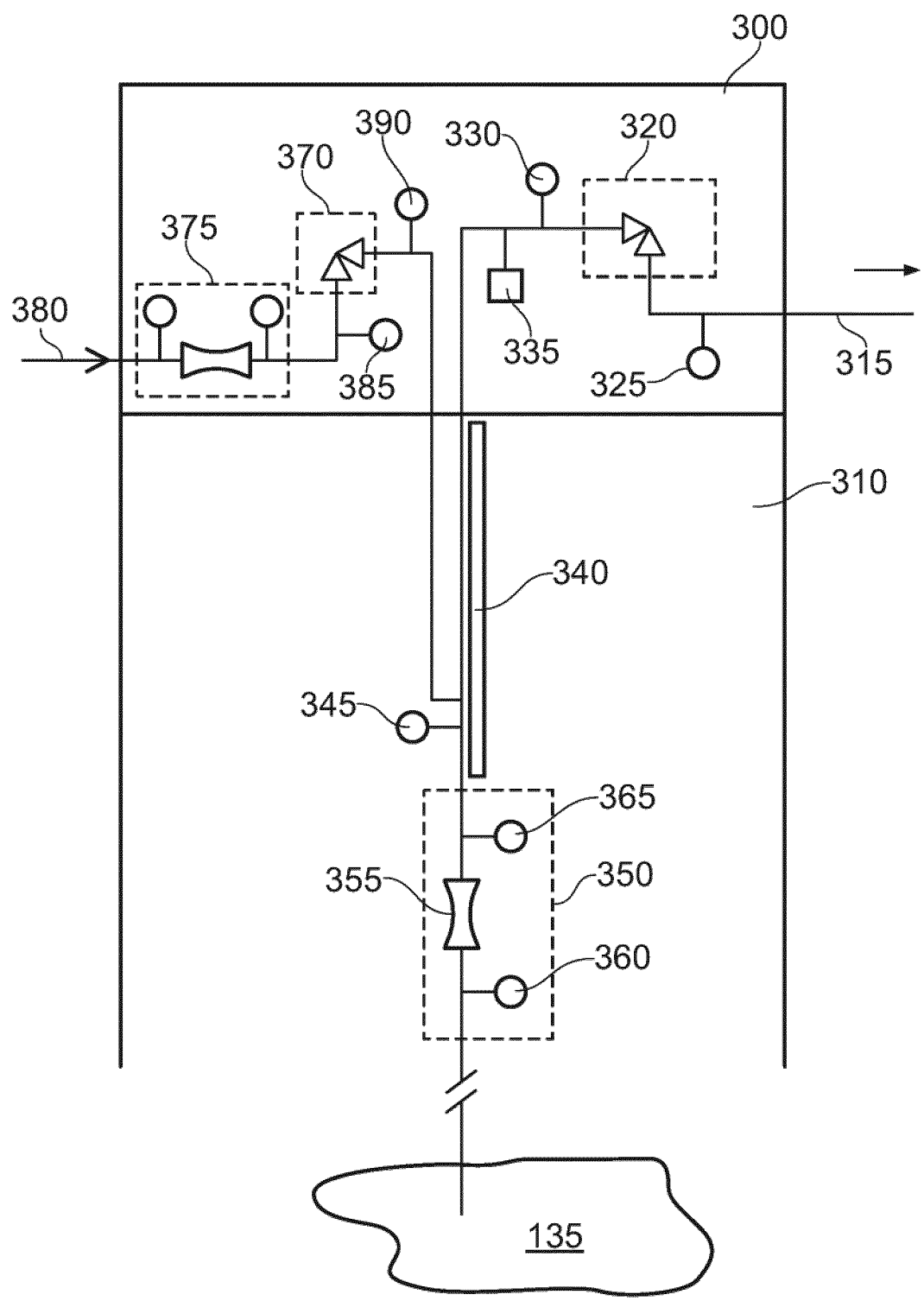
FIG. 3a illustrates an alternative completion and production tree.

FIG. 3a illustrates an alternative production tree 300 and completion 310 which makes use of gas-lift. The production tree and completion illustrated in FIG. 3a utilise similar parts to that shown in FIG. 2 but additionally include a gas-lift choke valve 370 and a gas-lift Venturi 375. The similar parts to those shown in FIG. 2 include an outlet flow 315; a production choke valve 320; a pressure sensor and temperature sensor 325 downstream of the production choke valve 320; a pressure sensor and temperature sensor 330 upstream of the production choke valve 320; a water sampling device 335 upstream of the production choke valve 320; a temperature profiling sensor array 340; a downhole pressure and temperature sensor in a sensing device 345; a downhole Venturi 350, including a flow restrictor element 355 and an upstream pressure sensor and upstream temperature sensor shown as a single sensor device 360 and a downstream pressure sensor and downstream temperature sensor shown as a respective single device 365. It will be understood that in FIG. 3a, as likewise discussed with respect to FIG. 2, it is possible for additional components or alternatives of the components to be used, and for the location of the components to be varied, as appropriate. A gas to provide gas-lift is provided at an inlet as a flow 380. The gas-lift Venturi 375 includes a flow restrictor and upstream and downstream pressure and temperature sensors. An additional optional pressure and temperature sensor 385 is located between the gas-lift Venturi 375 and the gas-lift choke valve 370. Likewise pressure and temperature sensors are provided as a sensing device 390 between the gas-lift choke valve and the injection point in the completion. For wells with a gas-lift configuration at least one of pressure and temperature measurements upstream and downstream of a gas-lift choke valve or a pressure differential across a gas-lift Venturi or other such convergent or divergent mechanism are utilised. Use of the various sensors and arrangements allow quantification of flow across the various system elements. For some of the elements this is because pressure and temperature drops are proportional to flow rate going through those elements. Also density of fluid due to measurements available at different true vertical depths (e.g. the pressure/temperature measurement) upstream of a production choke valve 320, at the production tree 300, will have a different elevation to downhole pressure/temperature measurement which helps allow for quantification of a mixture density.

Optionally water properties such as salinity or the like can likewise be determined using the water sampling device 335. Likewise additional pressure and temperature measurements within the completion such as by introducing separate pressure and temperature sensors at different true vertical depths can be utilised.

Aptly the downhole mass or volumetric flow rate determining device such as V-cone or Venturi 350 is located below the bubble or dew point of the system helps ensure a single phase flow regime which enables a more accurate measurement. Aptly the downhole mass or volumetric flow rate determining device is upstream of a gas-lift injection point if gas-lift is utilised.

Aptly a water cut sampling device is located in the production tree upstream of a production choke valve 320. Aptly an optional pressure and temperature measurement sensor is located at least 400 feet above a downhole Venturi 350 or V-cone. For wells with gas-lift an optional pressure and temperature measurement sensor is located as close as possible upstream of a lowest gas lift injection point within a completion.

As an alternative location for the water cut sampling device it is to be noted that this measurement could be taken additionally or alternatively downstream of a production choke valve 320.

Whilst certain embodiments of the present invention have been described as using Venturi elements downhole and as an alternative in a gas-lift configuration, it will be understood that other techniques for determining mass or volumetric flow rate could be utilised. For example V-cone devices could be utilised or separate flow diameter varying elements and associated pressure and temperature sensors spaced apart on either side of the change in diameter element.

Figure 3B:
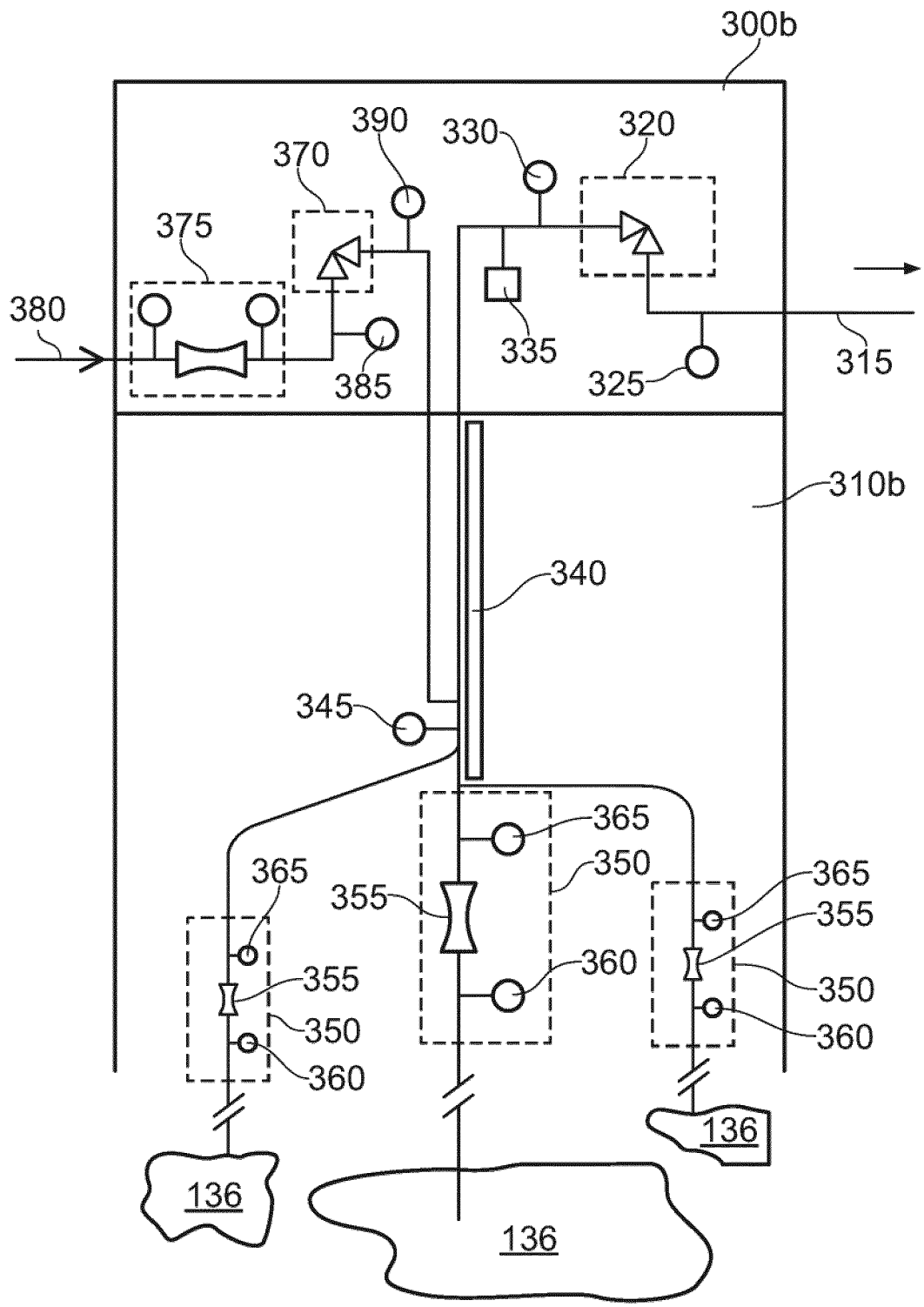
FIG. 3b illustrates a further alternative completion and production tree.

An optional pressure and temperature measurement sensor can be located at least 400 feet above a location where downhole measurements are made to help enable differentiation of the hydraulic head and thus quantification of fluid density. Aptly a location of an optional pressure and temperature sensor within the completion is at a sufficiently different vertical depth to enable quantification of mixture density because of the difference in elevation. FIG. 3b illustrates an alternative production tree 300b and completion 310b. The production tree and completion illustrated in FIG. 3a utilise similar parts to that shown in FIG. 3b. On systems with so-called smart completions 310b, one production tree 300b could service various reservoir locations 136 (e.g. two or three zones within a reservoir and/or multiple zones wherein two or more zones are within different reservoirs). Optionally multiple downhole Venturis 350 could be utilised one for each reservoir zone. Or on such systems one downhole Venturi downstream of a comingling point can be utilised for the various zones.

Figure 4:
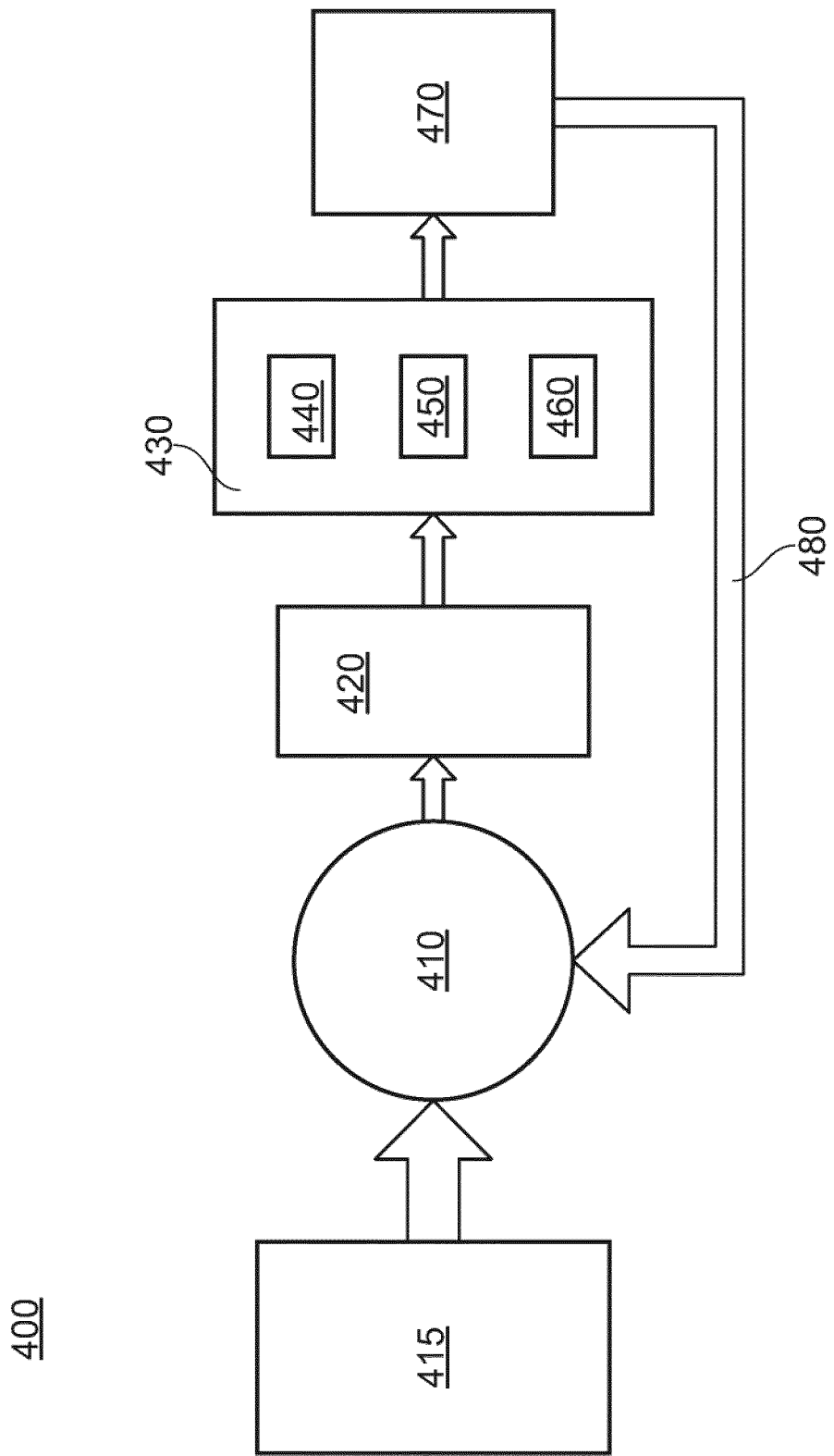
FIG. 4 illustrates a statistical estimator unit.

FIG. 4 illustrates a statistical estimator unit 400 in more detail. The statistical estimator unit 400 can be located in the MCC 170 or at other suitable locations. The statistical estimator unit outputs estimated flow rates for one or more phases in the fluid flowing from a subsea well. This is achieved utilising a statistical estimator module 410 which receives multiple real inputs 415 and helps optimise the relationship between multiple inputs and the flow rate flowing on that well (for example, helps minimise error across measured pressure drops, measured temperature drops, measured bulk downhole flow rates, and measured water liquid ratio on a well for a given flow rate). These real inputs correspond to the determined mass or volumetric flow rate of fluid in the completion or production tree of a subsea well as well as a water liquid ratio of the fluid determined via a water sampling device as well as a determined upstream fluid pressure and upstream fluid temperature upstream of a production choke valve in a subsea production tree as well as a determined downstream fluid pressure and downstream fluid temperature of a fluid downstream of the production choke valve as well as a downhole fluid pressure and a downhole fluid temperature of fluid. These real inputs can be provided by sensors as above-described which are arranged in a distributed arrangement across the subsea well at locations in the production tree and completion. The statistical estimator module 410 receives these plurality of real inputs 415 and provides interim estimated flow rates 420 as outputs for each phase of at least one phase in a fluid for a fluid flowing from at least one subsea well. These interim estimated flow rates outputs are input into an estimated input calculating module 430. This includes a physics-based flow model 440, a physics-based heat transfer model 450 and a physics-based Pressure Volume Temperature (PVT) model 460.

The physics-based flow models 440 can utilise the estimated flow rates as inputs and estimate pressure and/or temperature drops across system components that can be compared with measured values. The physics-based flow models 440 are optionally a Tulsa University Fluid Flow Projects (TUFFP) unified model or a Beggs and Brill model or a Sachdeva/Perkins (chokes) model or the like. The physics-based flow models 440 can compute the pressure/temperature drop across a pipe segment given the mass flow rate for each pressure loss segment. Aptly an approach for pipes is to select a pressure gradient model best suited for fluid application and pipe geometry, define a PVT model 460 to model fluid properties and mass transfer as a function of pressure and temperature, and to solve numerically the resulting ordinary differential equation. Aptly an approach for chokes is to select an appropriate model for fluid application and choke geometry, determine a critical pressure ratio, determine a flow regime, and then determine a pressure drop. Aptly an approach for Venturis or V-cones is to select an appropriate model for fluid application and Venturi or V-cone geometry, define a PVT model 460 to model fluid properties and mass transfer as a function of pressure and temperature, and then to determine a pressure drop.

Aptly the physics-based flow models 440 may account for, for example, a difference in flow velocity and variation in slip constraints between the phases in the multi-phase flow; stability of the multi-phase flow and the impact of said stability on the friction factor of the flow; surface tension effects; oil-water mixing status; gas-liquid flow patterns; non-constant densities and/or viscosities of the phases in the multi-phase flow; different flow regimes (stratified flow, bubble flow, annular flow, etc.); variable states of matter, and the proportions thereof, of the phases in the multi-phase flow; and thermodynamic effects.

Aptly software calculates the flow regime and resulting pressure drop based on continuity and momentum balance. For pipes, chokes, and Venturis a physics-based model of pressure losses along the components can take the form of a differential equation as per below:

$$\frac{dP}{dx} = f(\vec{Q}, P, \vec{\rho}, \vec{\eta}, \vec{\sigma}, \vec{\theta})$$

Where $$\frac{dP}{dx}$$

is the pressure gradient, $\vec{Q}$ is a term for the volumetric flow rates, P is the inlet pressure, $\vec{\rho}$ is the density, $\vec{\eta}$ is the viscosity, $\vec{\sigma}$ represents the surface tension, and $\vec{\theta}$ is a term due to the specific pipe geometry.

To help resolve this equation, a PVT model 460 can be defined to characterise fluid properties for each phase as a function of pressure and temperature. The PVT model can help define the fluid characteristics and enable calculation of the fluid properties as a function of pressure and temperature. For example, the expression for density (ρ), viscosity (η), and surface tension (σ) for the oil, gas, and water fractions can take the following form:

$$\vec{\rho}(P, T) = \begin{pmatrix} \rho_o(P, T) \\ \rho_w(P, T) \\ \rho_g(P, T) \end{pmatrix}$$

$$\vec{\sigma}(P, T) = \begin{pmatrix} \sigma_o(P, T) \\ \sigma_w(P, T) \\ \sigma_g(P, T) \end{pmatrix}$$

$$\vec{\eta}(P, T) = \begin{pmatrix} \eta_o(P, T) \\ \eta_w(P, T) \\ \eta_g(P, T) \end{pmatrix}$$

Mass conservation of the fluids can be considered within the models, for example when incorporating the effects of phase transitions and the (relative) solubilities of the phases in the multiphase flow. Inputs from the water sampling device, for example the water to liquid ratio, can be used to calibrate the fluid model in real time by adjusting the measured ratio, at the relevant pressure and temperature condition, within the PVT model 460.

However, inputs from the PVT model 460 can also be defined as measured parameters within the statistical estimator 410 and can be optimised along with pressure and temperature loss measurements.

The PVT model 460 also allows to relate the volumetric and mass flow rates as following:

$$\vec{Q}(\vec{m}, P, T) = \begin{pmatrix} Q_o(\vec{m}, P, T) \\ Q_w(\vec{m}, P, T) \\ Q_g(\vec{m}, P, T) \end{pmatrix}$$

Integrating the flow correlation equation results in the following expression:

$$p_2 = p_1 + \int_{x_1}^{x_2} f(\vec{m}, p, \vec{\theta}) \, dx$$

Where m is a term due to mass flow rate, p is a term due to the pressure distribution, and $\vec{\theta}$ is a term due to the specific pipe geometry. For well completions or subsea flowlines, the above equation can be used to determine the pressure gradient along the pipe using a discretisation method.

Physics-based flow models 440 for chokes and Venturis can be simplified to the following expression in general terms:

$$p_2 = f(p_1, Q, \alpha, \beta)$$

Where Q is a term for the volumetric flow rate, α is a term for the choke valve or Venturi geometry, and β is a term for the fluid properties, which are also obtained using the PVT model 460 as described above. Physics-based flow models 440 models may involve modelling a pressure drop across the choke, may require calculation of the critical pressure ratio to determine the flow regime, and may account for design parameters, such as the aforementioned choke or Venturi geometry. A flow regime through a choke can be referred to as critical, wherein the flow velocity equals sonic speed; subcritical, wherein the flow velocity is less than sonic speed; and transitional, wherein the flow velocity is such that the flow is on the boundary of critical and subcritical flow. Choked flow is observed during the critical flow regime and introduces a pressure discontinuity where mass flow through the choke is limited at the critical pressure ratio and would not increase with any further increases of the pressure differential across the valve.

Temperature loss models can be implemented using a similar mathematical expression:

$$\frac{dt}{dx} = g(\vec{m}, t, \vec{\theta})$$

The above equation allows for calculation of a temperature gradient within system components (well completions, chokes, pipes, etc.) which is also proportional to the fluid flow rate through the component and can be resolved along pipes using a discretisation method.

The physics-based heat transfer models 450 can include Enthalpy conservation models and/or Joule-Thomson balance models and/or a multi-phase heat transfer models (for example mechanistic multi-phase heat transfer models) or the like. The physics-based heat transfer models 450 can support an estimation of temperature loss within system components. The physics-based PVT models 460 can include compositional models (for example PVT sim) and/or a black oil models or the like. The estimated inputs module 430 determines estimated inputs 470. That is to say estimates values for the real inputs input into the statistical estimator. These are fed back via a feedback mechanism illustrated by the arrow 480 in FIG. 4 to the statistical estimator module 410. An iterative process continues until the estimated inputs match the real inputs. That is to say until the estimated inputs are identical to or closely approximate to the real inputs. This corresponds to a predetermined event. When the predetermined event occurs, that is to say the estimated inputs match the real inputs, the estimated flow rates 420 for that last iteration are known to be accurate. These estimated flow rates 420 for that iteration can then be utilised as determined estimated flow rates for at least one phase of a multi-phase fluid flowing from a subsea well.

FIGS. 5 to 9 help illustrate operation of components of the statistical estimation unit in more detail. Optimal positioning of the sensors can be arrived at through numerical analysis of the reservoir properties, and well geometry for any particular subsea system field configuration. The position of the downhole Venturi is selected to ensure a single phase flow regime which is below the bubble point. Aptly the water sampling device is positioned at the subsea production tree, upstream of the production choke valve. Aptly a position of pressure and temperature sensors is determined for each project application depending on the reservoir properties, well geometry, and the materials used in the completion and production tree. The approach to this optimization process is shown in the Figures throughout this specification.

Figure 5:
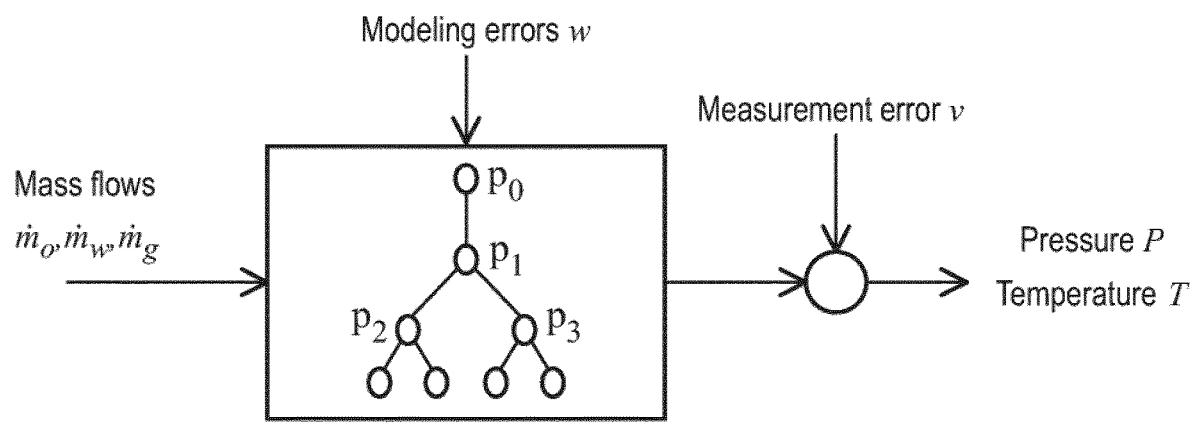

FIG. 5 illustrates a brief outline of model-based estimation. Shown left to right in FIG. 5, a 'forward' modelling of the production field is shown. The 'inputs' are the mass flow rates for the three phases oil $\dot{m}_o$, water $\dot{m}_w$, and gas $\dot{m}_g$; modelling errors w; and measurement errors v. The 'outputs' are pressure P and temperature T. In certain embodiments of the present invention an 'inverse' modelling approach may be utilised, wherein field data and the statistical estimator module 410 are used to find what is known as, with respect to FIG. 5, the 'inputs' i.e. given measured pressures, temperatures and other known quantities (e.g. chemical injection flows), which can be used to estimate the value of flows on each well.

Figure 6:
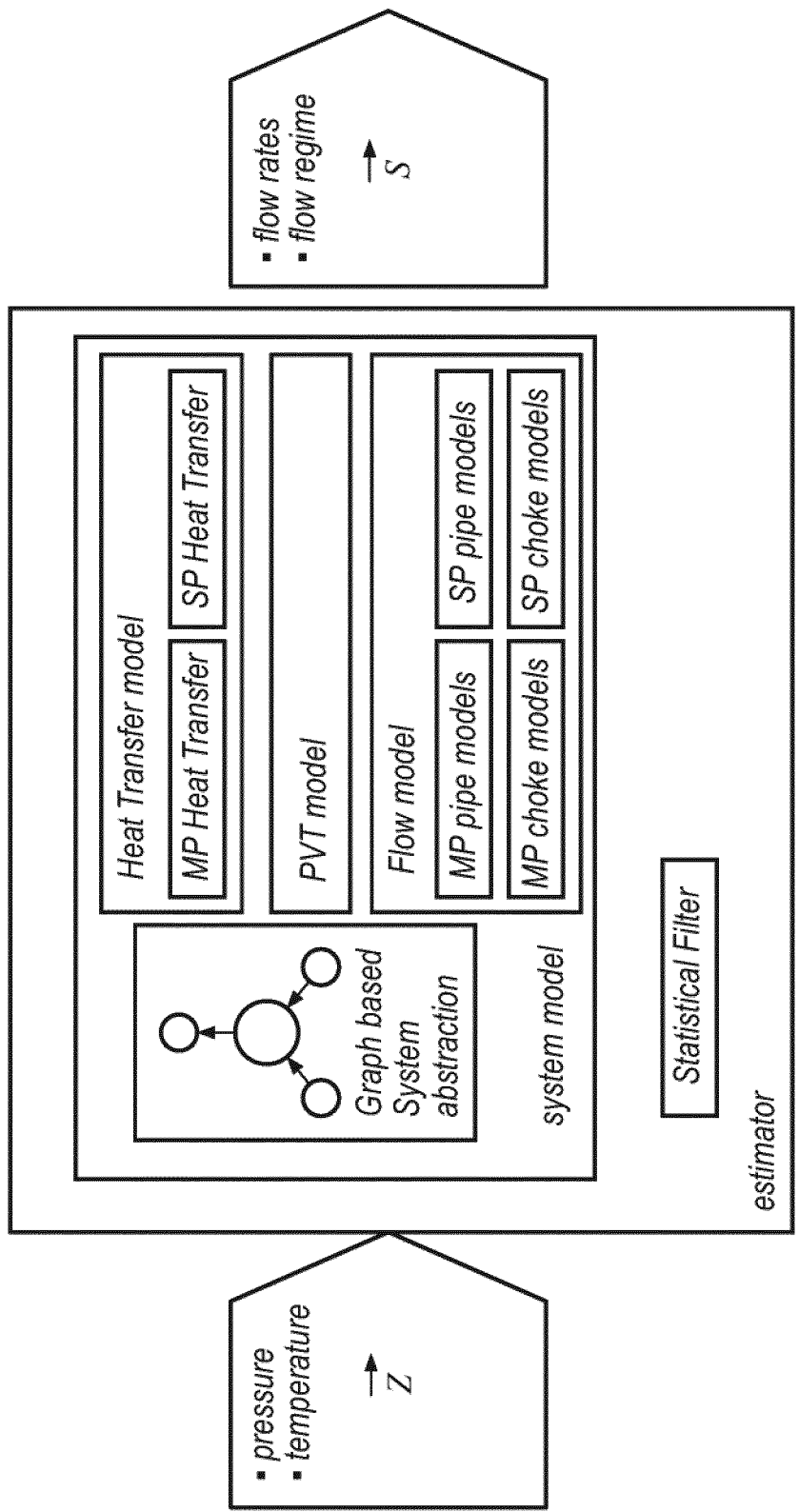

FIG. 6 illustrates a calculation engine architecture for the integrated flow metering solution, where 'MP' and 'SP' stand for 'multiphase' and 'single-phase' respectively.

Figure 7:
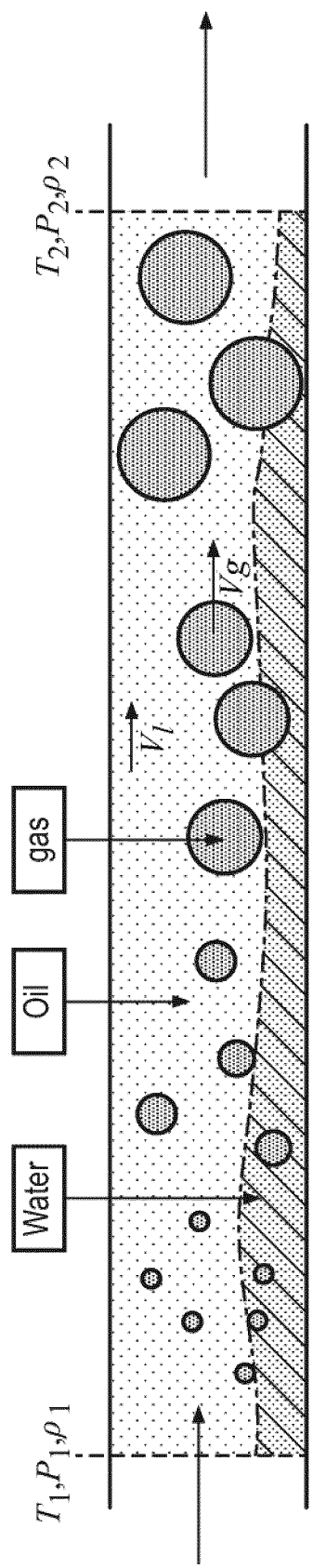

FIG. 7 schematically illustrates one possible example of a multiphase flow through a pipe. FIG. 7 includes references to multiple variables that can affect the multiphase flow, including the temperatures at two distinct points in the flow, $T_1$ and $T_2$; the pressures at two distinct points in the flow, $P_1$ and $P_2$; the densities at two distinct points in the flow, $\rho_1$ and $\rho_2$; the velocity of a liquid component of the flow, $v_l$; and the velocity of a gas component of the flow, $v_g$. Example boundaries between the phases in the multiphase flow are also shown in the figure, i.e. the circles showing a gas phase dispersed throughout the flow and the dash-dot line showing the boundary between the water and oil phases. The physics-based flow models 440 can include a dependence on these variables. It will be appreciated that there are many other variables that could affect the multiphase flow that are not explicitly referred to in FIG. 7, such as surface tension effects, a slip condition at the water-oil boundary, or the like.

Figure 8:
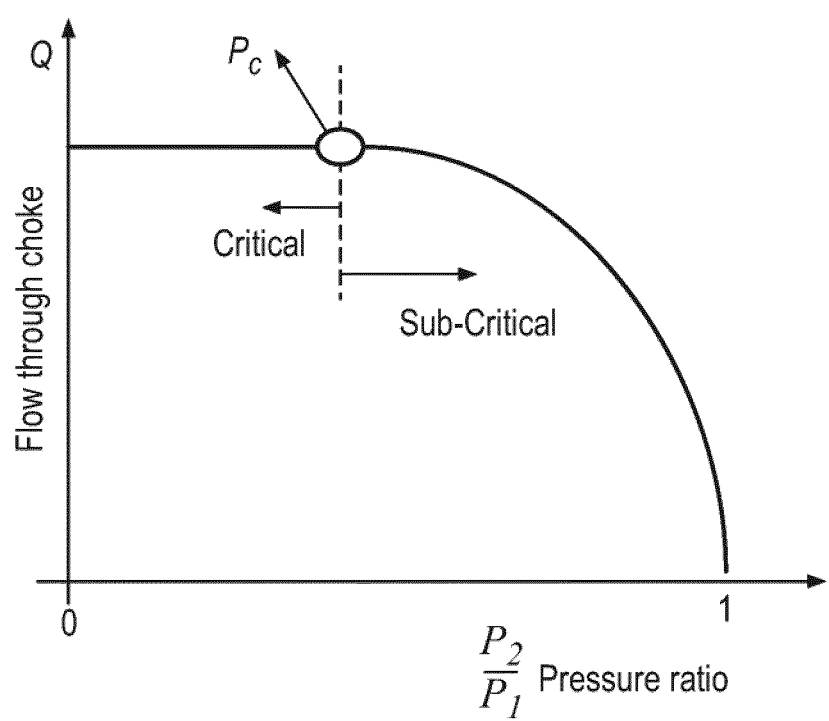

FIG. 8 illustrates an example relationship between a flow rate, Q, through a choke and a pressure ratio of the flow across the choke, $$\frac{P_2}{P_1},$$

for so-called critical and a subcritical flow regime. An implication of the various flow regimes includes that for a critical flow the flow rate cannot be increased by increasing a pressure drop across the choke; the flow rate is independent of downstream pressure. A further implication of the various flow regimes includes that for a subcritical flow the flow rate can be varied by varying a pressure drop across the choke; the flow rate shown varies linearly with the square root of a pressure drop.

Figure 9:
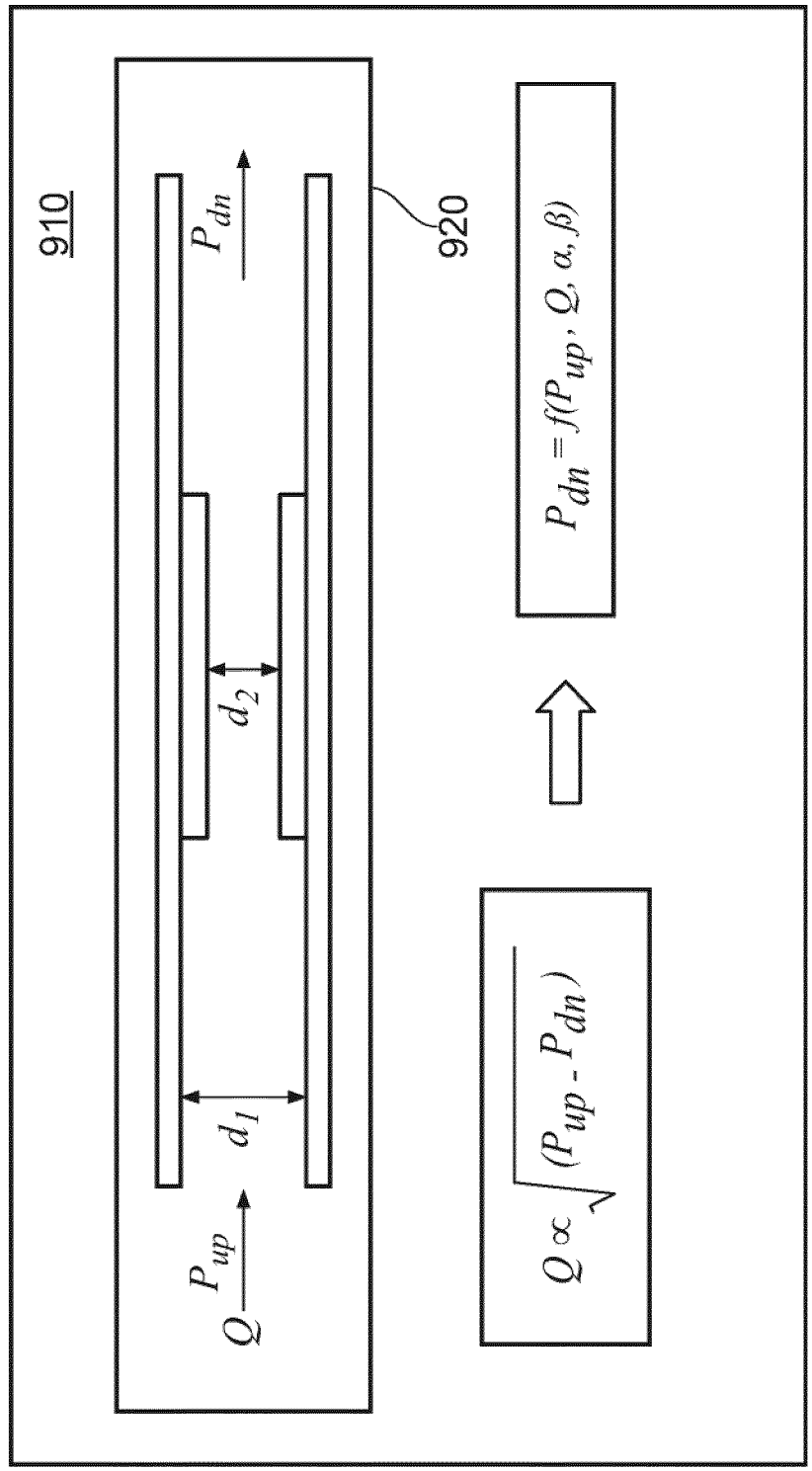

FIG. 9 illustrates a choke modelling framework 910, including a choke schematic 920. Labelled are the pressure of a multiphase flow upstream and downstream of a choke, $P_{up}$ and $P_{dn}$, respectively; a diameter of a pipe, $d_1$; a diameter of the choke, $d_2$; and a volume flow through a choke, Q. The choke modelling framework can be used to model a pressure drop across the choke from a known volume. The pressure drop across the choke may depend on the choke design parameters, $\alpha$; the fluid properties, $\beta$; the flow through the choke; and the critical, subcritical, and transition flow regimes. Similarly, the pressure drop across a Venturi may depend on the Venturi design parameters (e.g. a beta ratio of the Venturi) and fluid properties and flow through the Venturi.

Determining the mass flow across a Venturi for a homogenous mixture is well established within the literature. A typical equation can be found below:

$$\dot{m} = C_d \frac{\sqrt{2}}{\sqrt{(\beta^4 - 1)}} \sqrt{\rho_m dP}$$

Where $C_d$ is the discharge coefficient; dP is the pressure differential between the inlet and throat of the Venturi; $\rho_m$ is the density of the mixture; and $\beta$ is the beta ratio of the Venturi (a geometric parameter). From this equation, the pressure upstream of the Venturi may be obtained from a known flow rate.

Certain embodiments of the present invention thus provide for measurement of parameters associated with a fluid flowing such as pressure, temperature and composition from or to subsea wells using a combination of downhole and subsea instruments coupled with digital analytics. A deliberate reduction in subsea instrumentation by leveraging downhole metering and virtual flow metering, resulting in smaller and less expensive subsea structures such as production trees helps reduce subsea instrumentation and associated structure sizes and weights. As a result a minimum CAPEX and OPEX outlay is provided for an operator.

Downhole physical or optical meters combined with subsea instrumentation such as water cut meters on a subsea production tree and/or additional pressure/temperature sensors, coupled with physics-based digital analytics such as a virtual flow meter enable calculation of single and multiphase flow along with phase fractions.

Certain embodiments of the present invention provide a downhole single-phase meter combined with a water cut physical meter on a subsea production tree overlaid with a virtual flow meter with suitable correlations to match flow and phases.

Certain embodiments of the present invention provide a method for determining gas and/or water and/or oil flow from subsea wells in real-time by integration of discrete measurements associated with the well. Measurements include, but are not limited to, pressure drop measurements across choke valves associated with the well (e.g. production tree production choke valves) by differential pressure sensors or discrete pressure sensors at one or both sides of the choke valves. Furthermore pressure drop measurements across a dedicated flow diameter change mechanism such as a convergent or divergent restriction associated with the well can be determined by differential pressure sensors or discrete pressure sensors on either side of the flow change mechanism. For example a V-cone or Venturi like device can be utilised. Still furthermore discrete or distributed pressure and temperature measurements across subsea well locations (e.g. at the well head or downhole or at other locations in a completion) can be utilised to provide data usable as an input to a statistical estimator unit. Still furthermore water fraction (and associated properties) measurement associated with the well can be determined by use of a water sampling device such as a water cut meter.

Location of the sensors can include the production tree structure and well completion. Optionally other subsea components/structures associated with the well (e.g. well jumpers, headers etc.) can be utilised to support sensors providing further input for the statistical estimator unit. A possible water cut meter can be utilised to determine at least one of condensate, methanol oil, gas and/or water by determining absorption peaks over a wave length spectrum.

A downhole temperature monitoring can be utilised to provide a temperature profile of fluid flowing in the completion. The profile can be provided as an input to a statistical estimator module as a real input.

Optionally a downhole optical flow meter can be provided on production tubing in the completion which include multiple sensors or a sensor array outside a pipe which measure strain variants thereby tracking any currents which exert dynamic pressure on the pipe and which are caused by turbulent pipe flow.

Certain embodiments of the present invention provide an integrated flow metering solution which is combined with real-time analysis of multiple sensor outputs using a physics-based model and statistical technique. The modelling approach to aggregate all real measurements and determining a flow rate for phases in a fluid for the well is implemented using a bayesian framework. It will however be appreciated by the skilled person that other modelling frameworks could be utilised according to certain embodiments of the present invention. The flow rate of gas, oil and water at the well is proportional to pressure and temperature drop or other characterised components within the system. These can be measured in real time by suitable equipment (e.g. well pipe, Venturi device, choke trim etc.).

Certain embodiments of the present invention further provide that an integrated flow metering solution comprises an improved virtual flow meter, downhole flow meter and water cut measurements at the production tree ('XT'), providing accurate oil, gas, and water flow rate measurements at the well(s). The integrated flow metering solution can include a dependence on: correlations that relate a measured pressure and temperature drop to a (multiphase) flow rate; a frictional pressure drop that depends on a mass flow rate; a hydrostatic pressure drop (due to gravity) that depends on density; and a continuous mass flow through the system.

Certain embodiments of the present invention may be used to distinguish between 'field inputs' and 'facility inputs'; wherein field inputs comprise pressure, temperature, topside flows, topside pressure and/or temperature, available flow measurements, and the like. Facility inputs comprise pipe lengths; pipe diameters; fluid PVT data; Venturi characteristics; choke or valve flow coefficient curves ('$C_v$ curves'); and the like. Both sets of inputs may be incorporated into the flow rate calculations.

An estimation algorithm can be utilised to predict the flow gas, oil and water flow rates from each well and physics-based models can be utilised to estimate pressure and temperature drop across all components within the well (for the predicted flow rates). The statistical estimator unit optimises (tries to make equal) the relationship between the estimated and measured pressure and temperature drops across the various components within the system. This helps determine an optimum estimated flow rate for that well for one or more phases in the fluid that flows from the well.

Aptly the model-based estimation algorithm is an "extended kalman filter" or a bayesian filter. Aptly other estimation algorithms such as batch non-linear least squares, moving horizon estimation and/or particle filters could be utilised according to certain other embodiments of the present invention.

The statistical estimation unit can optionally implement a Darcy-Weisbach for single phase flow across pipes or Beggs and Brill and a unified model (e.g. TUFFP) for multi-phase flow across pipes. Alternatively/additionally the Sachdeva and Perkins models for pressure drops across chokes and homogenous models for Venturi calculations.

Certain physics-based models to estimate pressure and temperature drops across the various components within the system can be established according to conventional techniques and as described in this document.

Certain embodiments of the present invention thus provide a novel combination of sensors at a completion/well head/production tree location which are optimally placed to improve accuracy of estimated flow rate relative to conventional techniques. The aggregation of a particular combination of sensors using a statistical bayesian framework (wherein an extended kalman filter or bayesian filter is used) is also provided by according to certain embodiments of the present invention.

According to certain embodiments of the present invention a device which introduces a known diameter change mechanism such as a convergent or divergent pipe section can be utilised to provide a predetermined pressure drop or pressure rise. Such a device can be used downhole. Aptly the flow change mechanism is located below a well bubble point (dew point) where the device is more accurate due to a favourable flow regime. A flow restrictor can be utilised to provide a predetermined pressure drop. A Venturi device is an example of such a flow restrictor element.

Use of discrete of distributed pressure/temperature measurements with different true vertical depths across the subsea well (e.g. downhole or at the well head or at the production tree) enables calculation of bulk/mixture density (thus negating the need for bulk density sensors or radioactive sources).

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of determining at least one estimated flow rate for at least one phase of a multi-phase fluid flowing from a subsea well, comprising the steps of:
   determining, by a flow meter device, a mass or volumetric flow rate of a fluid in a completion or production tree of the subsea well;
   determining a Water Liquid Ratio (WLR) of said fluid via a water sampling device;
   determining an upstream fluid pressure and an upstream fluid temperature of said fluid at a location upstream of a production choke valve in the subsea production tree via at least one first pressure sensor and at least one first temperature sensor of the subsea production tree;
determining a downstream fluid pressure and a downstream fluid temperature of the fluid at a location downstream of the production choke valve via at least one second pressure sensor and at least one second temperature sensor of the subsea production tree;
determining a downhole fluid pressure and a downhole fluid temperature of said fluid via at least one third pressure sensor and at least one third temperature sensor located downhole in the completion; and
determining, by a statistical estimator unit including a statistical estimator module, and an estimated input calculating module further including a physics-based flow module, a physics-based heat transfer model and a physics-based Pressure-Volume-Temperature model, at least one estimated flow rate for at least one phase of the multi-phase fluid, the determining further comprising
receiving, by the statistical estimator module, a plurality of real inputs corresponding to the determined mass or volumetric flow rate, water liquid ratio, upstream fluid pressure, upstream fluid temperature, downstream fluid pressure, downstream fluid temperature, downhole fluid pressure and downhole fluid temperature from the flow meter device, the water sampling device, the first pressure sensor, the first temperature sensor, the second pressure sensor, the second temperature sensor, the third pressure sensor and the third temperature sensor, respectively;
determining, by the statistical estimator module, at least one interim estimated flow rate for each phase of at least one phase of the fluid based on the plurality of real inputs;
providing, by the statistical estimator module, the at least one interim estimated flow rate to the estimated input calculating module;
determining, by the estimated input calculating module, a plurality of interim inputs based on the at least one interim estimated flow rate, wherein the plurality of interim inputs include an interim mass or volumetric flow rate, interim water liquid ratio, interim upstream fluid pressure, interim upstream fluid temperature, interim downstream fluid pressure, interim downstream fluid temperature, interim downhole fluid pressure and interim downhole fluid temperature;
providing, by the estimated input calculating module, the plurality of interim inputs as inputs to the statistical estimator module;
repeating, by the statistical estimator unit, the steps of determining the at least one interim estimated flow rate and providing the at least one interim estimated flow rate into the estimated input calculating module, determining the plurality of interim inputs, and providing the plurality of interim inputs as inputs into the statistical estimator module until the plurality of interim inputs are within a predetermined range of the plurality of real inputs; and
providing, by the statistical estimator unit, the at least one interim estimated flow rate as the respective determined at least one estimated flow rate for at least one phase of the multi-phase fluid flowing from the subsea well.

2. The method as claimed in claim 1, wherein determining a mass or volumetric flow rate further comprises:
determining a downhole mass or volumetric flow rate of the fluid in the completion.

3. The method as claimed in claim 1, further comprising:
determining an optically derived distributed temperature profile of said fluid at a downhole location via a downhole optical monitoring system; and
providing the optically derived temperature profile for at least one downhole location as an input to the statistical estimator unit.

4. The method as claimed in claim 2, wherein the flow meter device is a V-cone device or a Venturi device.

5. The method as claimed in claim 4, further comprising:
determining the downhole mass or volumetric flow rate at a location below an associated well dew point for the subsea well.

6. The method as claimed in claim 4, further comprising:
determining the downhole mass or volumetric flow rate at a location below an associated well bubble point for the subsea well.

7. The method as claimed in claim 1 where in the subsea well has a gas-lift configuration, further comprising:
determining a Gas-Lift Upstream Pressure (GLUP) and a Gas-Lift Upstream Temperature (GLUT) of a gas-lift fluid upstream of a gas-lift choke valve and determining a Gas-Lift Downstream Pressure (GLDP) and a Gas-Lift Downstream Temperature (GLDT) of the gas-lift fluid downstream of the gas-lift choke valve and providing the gas-lift upstream pressure and gas-lift upstream temperature and gas-lift downstream pressure and gas-lift downstream temperature as respective inputs to the statistical estimator unit; and/or
determining a Gas-Lift Fluid Flow Rate (GLFFR) via a Venturi device upstream of the gas-lift choke valve and providing the gas-lift fluid low rate as an input to the statistical estimator unit.

8. The method as claimed in claim 1, further comprising:
determining a plurality of discrete pressure and/or temperature values for the fluid at a respective plurality of vertical depths across the subsea well and providing the discrete pressure and/or temperature values as respective inputs to the statistical estimator unit.

9. The method as claimed in claim 2, further comprising:
determining the downhole mass or volumetric flow rate via a pipe diameter change element and an upstream and downstream pressure sensor respectively upstream or downstream of the diameter change element.

10. The method as claimed in claim 1, further comprising:
determining the at least one estimated flow rate in real time.

11. A subsea well, comprising:
at least one production tree comprising a production choke valve, at least one water sampling device, a first upstream pressure sensor and a first downstream pressure sensor respectively upstream and a downstream of the production choke valve and a first upstream temperature sensor and a first downstream temperature sensor respectively upstream and downstream of the production choke valve;
a well completion comprising, a production casing in a borehole and at least one completion pipeline comprising, a downhole flow meter device that determines a downhole mass or volume flow rate of fluid flowing in a pipe diameter change element, and second upstream and downstream pressure and temperature sensors respectively upstream or downstream of the pipe diameter change element for providing a downhole mass or volume flow rate of fluid flowing in the completion pipeline; and a statistical estimator unit comprising a statistical estimator module, and an estimated input calculating module further comprising a physics-based flow module, a physics-based heat transfer model and a physics-based Pressure-Volume-Temperature model, wherein the statistical estimator unit is configured to perform operations including receiving, by the statistical estimator module, a plurality of real inputs corresponding to the determined mass or volumetric flow rate, water liquid ratio, upstream fluid pressure, upstream fluid temperature, downstream fluid pressure, downstream fluid temperature, downhole fluid pressure and downhole fluid temperature from the flow meter device, the water sampling device, the first pressure sensor, the first temperature sensor, the second pressure sensor, the second temperature sensor, the third pressure sensor and the third temperature sensor, respectively;

determining, by the statistical estimator module, at least one interim estimated flow rate for each phase of at least one phase of the fluid based on the plurality of real inputs;

providing, by the statistical estimator module, the at least one interim estimated flow rate to the estimated input calculating module;

determining, by the estimated input calculating module, a plurality of interim inputs based on the at least one interim estimated flow rate, wherein the plurality of interim inputs include an interim mass or volumetric flow rate, interim water liquid ratio, interim upstream fluid pressure, interim upstream fluid temperature, interim downstream fluid pressure, interim downstream fluid temperature, interim downhole fluid pressure and interim downhole fluid temperature;

providing, by the estimated input calculating module, the plurality of interim inputs as inputs to the statistical estimator module;

repeating, by the statistical estimator unit, the steps of determining the at least one interim estimated flow rate and providing the at least one interim estimated flow rate into the estimated input calculating module, determining the plurality of interim inputs, and providing the plurality of interim inputs as inputs into the statistical estimator module until the plurality of interim inputs are within a predetermined range of the plurality of real inputs; and providing, by the statistical estimator unit, the at least one interim estimated flow rate as the respective determined at least one estimated flow rate for at least one phase of the multi-phase fluid flowing from the subsea well.

12. The subsea well as claimed in claim 11, wherein the pipe diameter change element is a convergent or divergent pipe diameter change member.

13. The subsea well as claimed in claim 11, wherein the downhole flow meter device comprises a V-cone device or Venturi device.

14. The subsea well as claimed in claim 11 wherein the downhole mass flow rate device is below the well dew point in the completion pipeline.

15. The subsea well as claimed in claim 11 wherein the downhole mass flow rate device is below the well bubble point in the completion pipeline.

16. The subsea well as claimed in claim 11, wherein the second upstream pressure and temperature sensors upstream of the pipe diameter change element comprise downhole pressure and temperature sensors.

17. A system for determining at least one estimated flow rate for at least one phase of a multi-phase fluid flowing from a subsea well, comprising:

at least one subsea well and associated completion, comprising at least one production tree comprising a production choke valve, a first pressure sensor and a second pressure sensor respectively upstream and downstream of the production choke valve, a first temperature sensor and a second temperature sensor respectively upstream and downstream of the production choke valve, a production casing in a borehole, at least one completion pipeline, a flow meter device for determining a mass or volumetric flow rate of a flowing fluid and at least one water sampling device for determining a water liquid ratio of the flowing fluid, a third pressure sensor and a third temperature sensor located downhole in the completion pipeline; and a statistical estimator unit comprising a statistical estimator module, and an estimated input calculating module further comprising a physics-based flow module, a physics-based heat transfer model and a physics-based Pressure-Volume-Temperature model, wherein the statistical estimator unit is configured to perform operations including receiving, by the statistical estimator module, a plurality of real inputs corresponding to the determined mass or volumetric flow rate, water liquid ratio, upstream fluid pressure, upstream fluid temperature, downstream fluid pressure, downstream fluid temperature, downhole fluid pressure and downhole fluid temperature from the flow meter device, the water sampling device, the first pressure sensor, the first temperature sensor, the second pressure sensor, the second temperature sensor, the third pressure sensor and the third temperature sensor, respectively;

determining, by the statistical estimator module, at least one interim estimated flow rate for each phase of at least one phase of the fluid based on the plurality of real inputs;

providing, by the statistical estimator module, the at least one interim estimated flow rate to the estimated input calculating module;

determining, by the estimated input calculating module, a plurality of interim inputs based on the at least one interim estimated flow rate, wherein the plurality of interim inputs include an interim mass or volumetric flow rate, interim water liquid ratio, interim upstream fluid pressure, interim upstream fluid temperature, interim downstream fluid pressure, interim downstream fluid temperature, interim downhole fluid pressure and interim downhole fluid temperature;

providing, by the estimated input calculating module, the plurality of interim inputs as inputs to the statistical estimator module;

repeating, by the statistical estimator unit, the steps of determining the at least one interim estimated flow rate and providing the at least one interim estimated flow rate into the estimated input calculating module, determining the plurality of interim inputs, and providing the plurality of interim inputs as inputs into the statistical estimator module until the plurality of interim inputs are within a predetermined range of the plurality of real inputs; and providing, by the statistical estimator unit, the at least one interim estimated flow rate as the respective determined at least one estimated flow rate for at least one phase of the multi-phase fluid flowing from the subsea well.

\* \* \* \* \*